United States Patent
Dudar (10) Patent No.: US 10,183,660 B2
(45) Date of Patent: Jan. 22, 2019

(54) SYSTEM AND METHODS FOR PURGING AN AIR INTAKE SYSTEM HYDROCARBON TRAP TO A FUEL VAPOR CANISTER

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 213 days.

(21) Appl. No.: 15/042,416

(22) Filed: Feb. 12, 2016

(65) Prior Publication Data

US 2017/0234246 A1 Aug. 17, 2017

(51) Int. Cl.

| | |
|---|---|
| B60W 10/30 | (2006.01) |
| F02M 25/08 | (2006.01) |
| F02M 35/10 | (2006.01) |
| B60W 20/40 | (2016.01) |
| B60W 10/06 | (2006.01) |
| B60W 10/08 | (2006.01) |
| F02D 41/04 | (2006.01) |
| F02M 35/02 | (2006.01) |

(52) U.S. Cl.
CPC ............ *B60W 10/30* (2013.01); *B60W 10/06* (2013.01); *B60W 10/08* (2013.01); *B60W 20/40* (2013.01); *F02D 41/042* (2013.01); *F02M 25/0836* (2013.01); *F02M 25/0854* (2013.01); *F02M 35/10222* (2013.01); *F02M 35/0218* (2013.01); *Y10S 903/93* (2013.01)

(58) Field of Classification Search
CPC .. F02D 41/004; F02M 25/08; F02M 25/0836; F02M 25/0854; B60W 10/06; B60W 10/30

USPC ............................ 701/22; 123/519, 516, 520
See application file for complete search history.

(56) References Cited

U.S. PATENT DOCUMENTS

| | | | |
|---|---|---|---|
| 6,581,580 B2 | 6/2003 | Trumpy et al. | |
| 6,763,298 B2 | 7/2004 | Boggs et al. | |
| 7,233,845 B2 | 6/2007 | Veinotte | |
| 7,607,293 B2 | 10/2009 | Tamai et al. | |
| 8,181,631 B2 | 5/2012 | Bohr et al. | |

(Continued)

OTHER PUBLICATIONS

Dudar, Aed M., "System and Methods for Purging Residual Exhaust and Uncombusted Fuel to a Fuel Vapor Canister," U.S. Appl. No. 14/606,779, filed Jan. 27, 2015, 52 pages.

(Continued)

*Primary Examiner* — Isaac G Smith
(74) *Attorney, Agent, or Firm* — Julia Voutyras; McCoy Russell LLP (57) ABSTRACT

A method for a vehicle engine is presented, wherein during a first condition, a vehicle controller is placed in a sleep mode following a vehicle-off event and then awoken following a duration, at which time contents of an air intake system hydrocarbon trap are purged to a fuel vapor canister by operating an electric motor to rotate the vehicle engine in a reverse direction. Rotating the vehicle engine in a reverse direction causes atmospheric air to enter an intake of the engine via an exhaust of the engine, desorbing hydrocarbons bound to the air intake system hydrocarbon trap. By porting the desorbed hydrocarbons to the fuel vapor canister, bleed emissions from the air intake system hydrocarbon trap may be reduced.

18 Claims, 5 Drawing Sheets

(56) References Cited

U.S. PATENT DOCUMENTS

| | | | |
|---|---|---|---|
| 8,379,766 B2 | 2/2013 | Lococo et al. | |
| 8,849,503 B1 | 9/2014 | Dudar | |
| 2004/0226530 A1* | 11/2004 | Kojima | F02D 41/006 |
| | | | 123/179.3 |
| 2013/0032127 A1* | 2/2013 | Jentz | F02N 11/003 |
| | | | 123/520 |
| 2013/0152905 A1 | 6/2013 | Woods et al. | |
| 2014/0318506 A1* | 10/2014 | Yang | F02D 41/042 |
| | | | 123/519 |

OTHER PUBLICATIONS

Dudar, Aed M., "System and Methods for Purging Residual Exhaust and Uncombusted Fuel to an Exhaust Catalyst," U.S. Appl. No. 14/701,094, filed Apr. 30, 2015, 52 pages.

Dudar, Aed M., "System and Methods for Purging Residual Exhaust and Uncombusted Fuel to a Fuel Vapor Canister," U.S. Appl. No. 14/810,177, filed Jul. 27, 2015, 48 pages.

Dudar, Aed M., "Periodic Engine Lubrication for PHEVs," U.S. Appl. No. 15/004,674, filed Jan. 22, 2016, 64 pages.

* cited by examiner

SYSTEM AND METHODS FOR PURGING AN AIR INTAKE SYSTEM HYDROCARBON TRAP TO A FUEL VAPOR CANISTER

FIELD

The present description relates generally to methods and systems for controlling a vehicle engine to reduce engine emissions following vehicle shutdown.

BACKGROUND/SUMMARY

In hybrid electric vehicles (HEVs), the fuel vapor canister primarily adsorbs refueling vapors, as refueling and diurnal vapors are sealed within the fuel tank by a fuel tank isolation valve. An air intake system hydrocarbon (AIS HC) trap may capture hydrocarbons emitted by leaky injectors and/or from fuel that may puddle in the engine intake. The AIS HC trap may also capture uncombusted fuel that is trapped within the engine cylinders themselves. An AIS HC trap is required for vehicles to be classified as practically zero emissions vehicles (PZEVs).

The contents of the AIS HC trap may be purged to engine intake during engine operation by opening an intake throttle plate, thus directing fresh air through the trap and desorbing bound hydrocarbons for combustion. However, hybrid vehicles may operate for prolonged periods without combusting fuel, thus limiting opportunities to purge the fuel vapor canister and AIS HC trap for combustion. This may lead to an increase in bleed emissions if the vehicle is parked for an extended duration while one or both adsorption beds contain hydrocarbons. Alternatively, the engine may be forced on to purge the adsorption beds which decreases the fuel economy of the vehicle.

Other attempts to address AIS HC purging include desorbing hydrocarbons from the AIS HC to the fuel vapor canister by applying a vacuum downstream of the canister. One example approach is shown by Yang et al. in U.S. Patent Application 2014/0318506. Therein, vacuum stored in the fuel tank is applied to the engine intake during an engine-off condition, thus delivering uncombusted fuel to the canister. However, the inventors herein have recognized potential issues with such systems. As one example, the method depends on fuel tank vacuum, which may develop at certain points in a diurnal cycle when ambient temperature is low. If the vehicle is parked in the sun, the fuel tank may initially develop a positive pressure, thus nullifying the method at the time when hydrocarbon breakthrough is most likely.

In one example, the issues described above may be addressed by a method for a vehicle engine, wherein during a first condition, a vehicle controller is placed in a sleep mode following a vehicle-off event and then awoken following a duration, at which time contents of an air intake system hydrocarbon trap are purged to a fuel vapor canister by operating an electric motor to rotate the vehicle engine in a reverse direction. Rotating the vehicle engine in a reverse direction causes atmospheric air to enter an intake of the engine via an exhaust of the engine, desorbing hydrocarbons bound to the air intake system hydrocarbon trap. By porting the desorbed hydrocarbons to the fuel vapor canister, bleed emissions from the air intake system hydrocarbon trap may be reduced.

As one example, the first condition may include an indication to purge the air intake system hydrocarbon trap based on engine operating parameters during a drive cycle immediately preceding the vehicle-off event. The purge indication may be issued in response to a drive cycle wherein the engine was operated in a combustion mode for a duration followed by a duration of vehicle operation in a battery only mode. In this way, if the AIS HC trap is likely to have adsorbed hydrocarbons without an opportunity to be purged to the engine for combustion prior to turning the vehicle off, the trap may be purged during the vehicle-off duration, thus limiting bleed emissions.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 2:
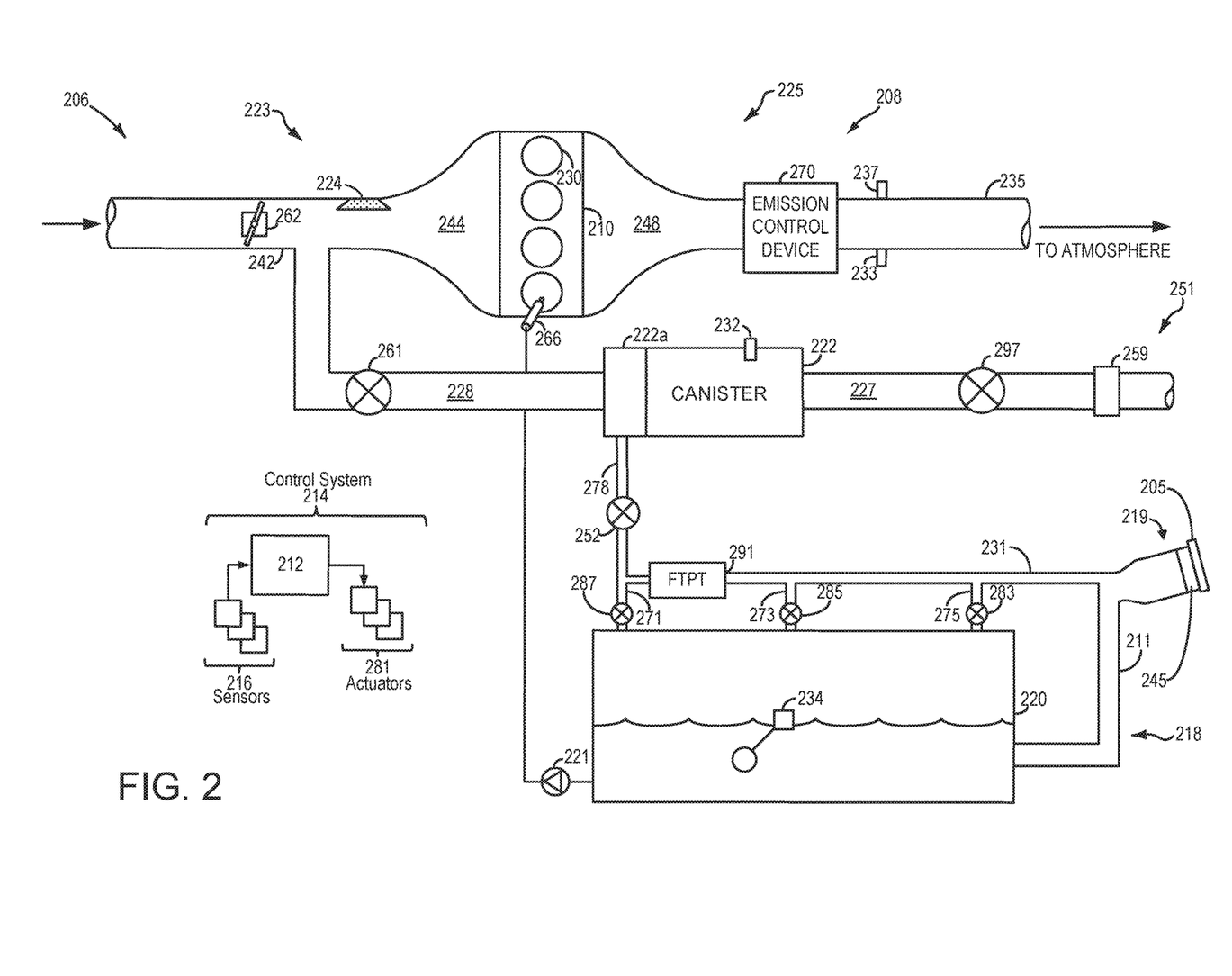
FIG. 2 schematically shows an example vehicle system with a fuel system and an evaporative emissions system.
Figure 3A:
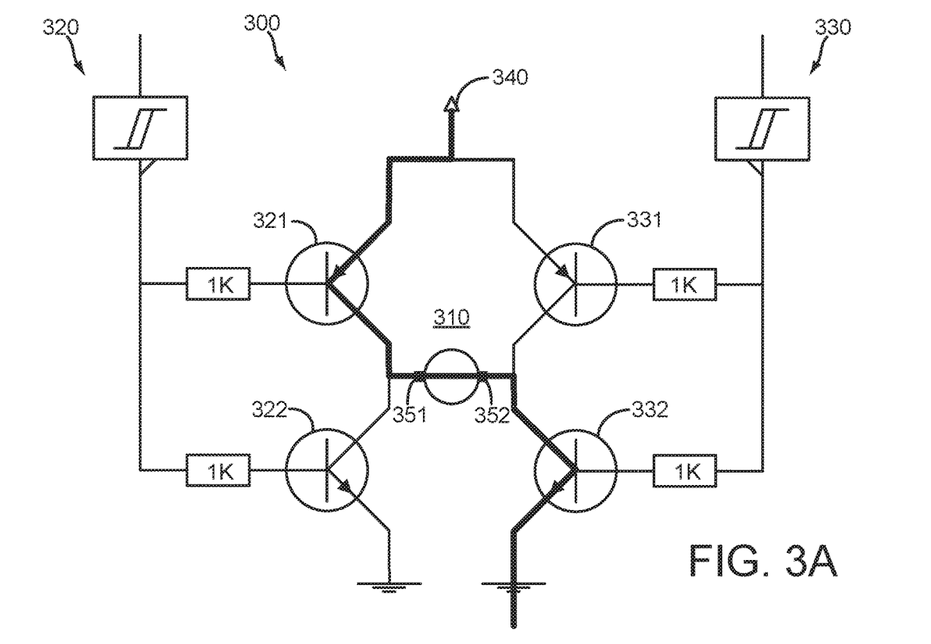
FIGS. 3A and 3B show a schematic depiction of an electronic circuit configured to reverse the spin orientation of an electric motor.
Figure 3B:
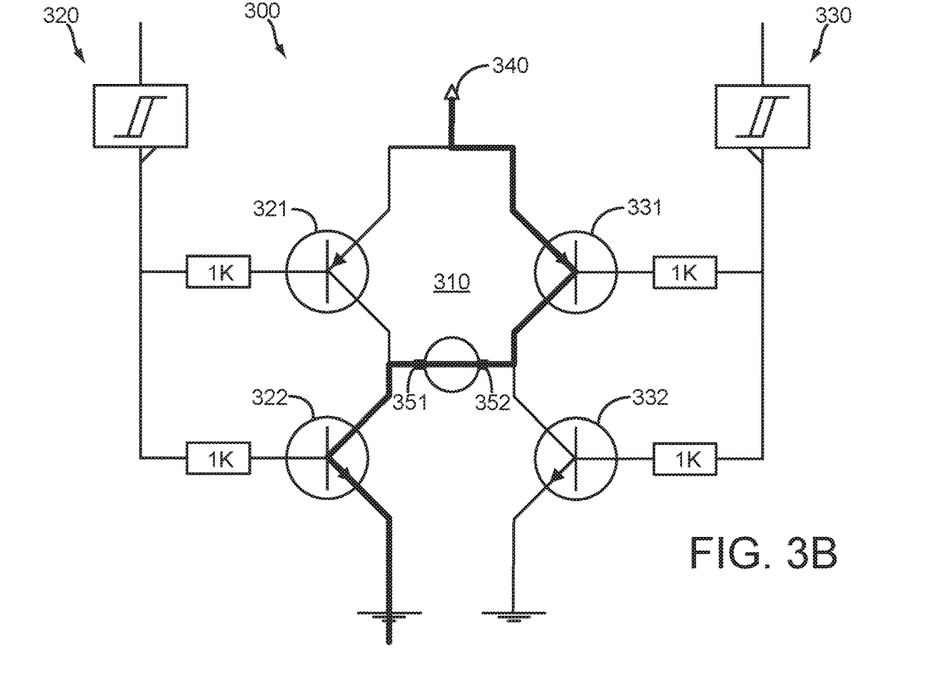
Figure 4:
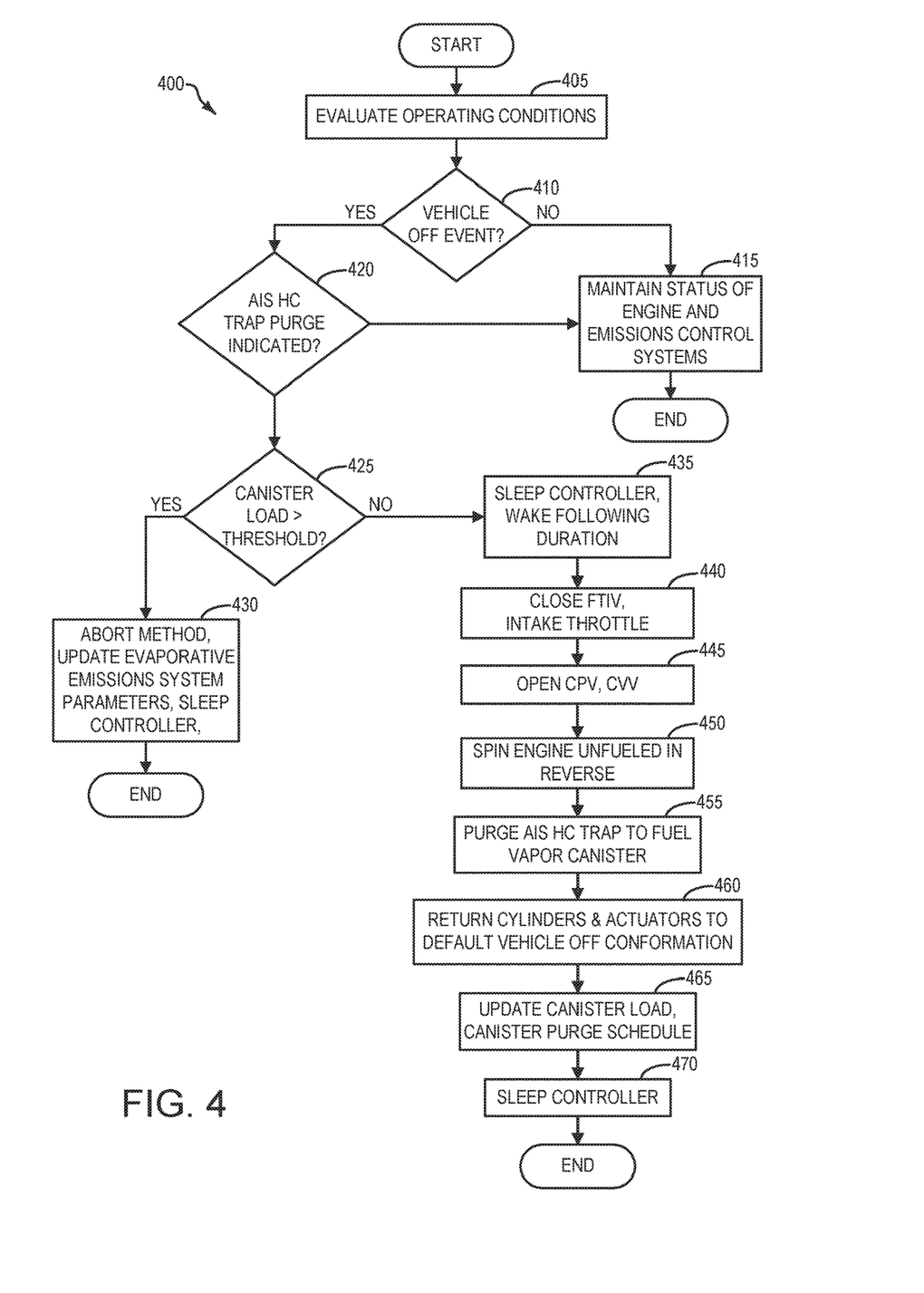
FIG. 4 shows a flowchart for a high level method for purging an air intake system hydrocarbon trap to a fuel vapor canister by spinning an engine unfueled in reverse.
Figure 5:
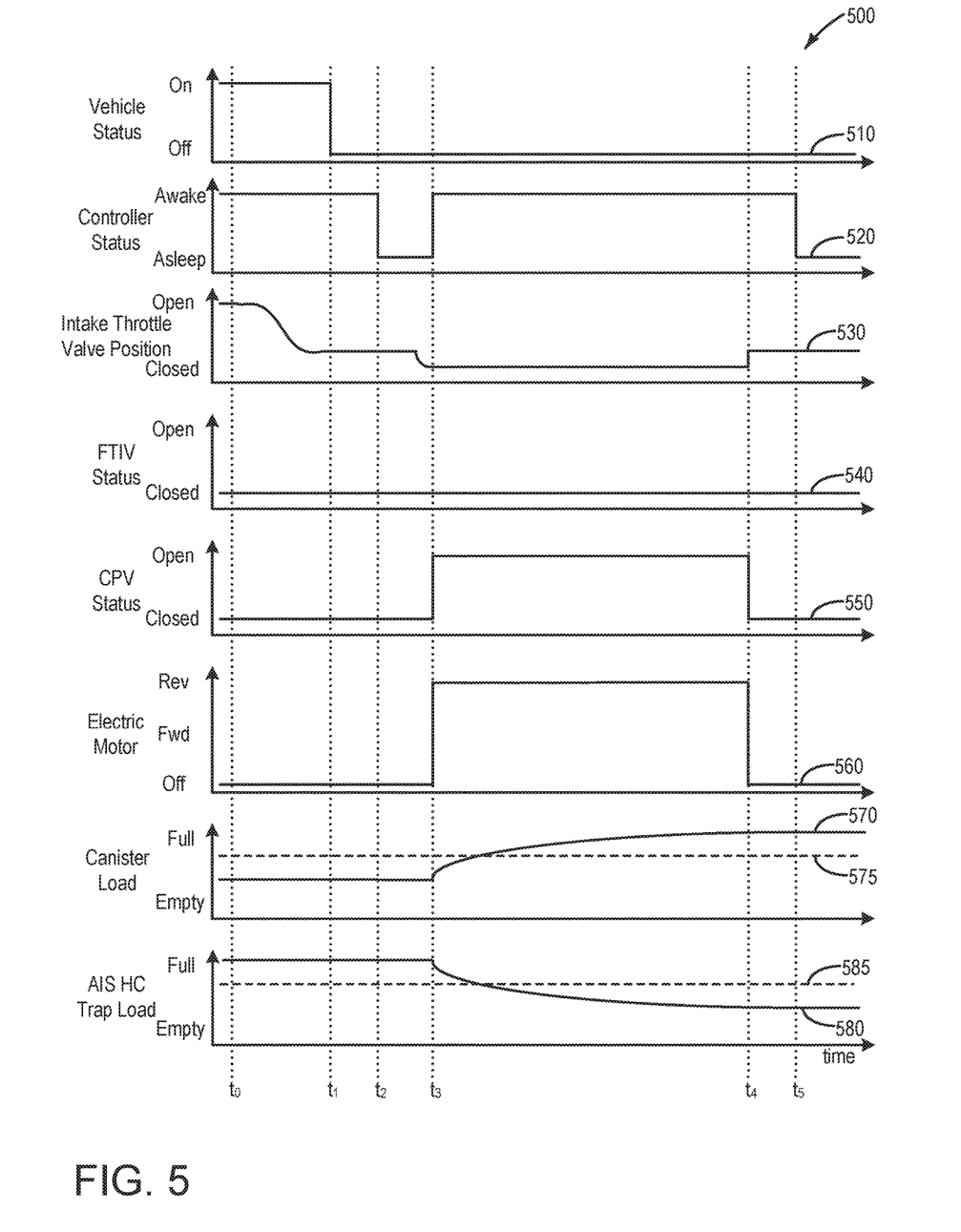
FIG. 5 shows an example timeline for an air intake system hydrocarbon trap purge event in accordance with the present disclosure.

The following description relates to systems and methods for purging the contents of an air intake system hydrocarbon trap to a fuel vapor canister during an engine-off condition. The system and methods may be applied to a vehicle system capable of spinning an engine unfueled in reverse with an electric motor, such as the hybrid vehicle system depicted in FIG. 1. The engine may be coupled to an emissions control system and an exhaust system, as depicted in FIG. 2. During a vehicle-off condition, if the engine is spun unfueled in reverse, a vacuum may be generated in the engine exhaust, thus driving atmospheric air into the engine intake when an engine cylinder intake valve is opened. In this conformation, if a canister purge valve is opened, uncombusted fuel stored in an intake hydrocarbon trap will be forced into the fuel vapor canister. The direction of the electric motor may be reversed using an H-bridge circuit, such as the circuit shown in FIGS. 3A-3B, thus allowing the engine to be spun in reverse. A method for evacuating the AIS hydrocarbon trap via unfueled spinning of the engine in reverse is depicted in FIG. 4. A timeline for vehicle operation including the purging of an AIS hydrocarbon trap using the method of FIG. 4 is shown in FIG. 5.

Figure 1:
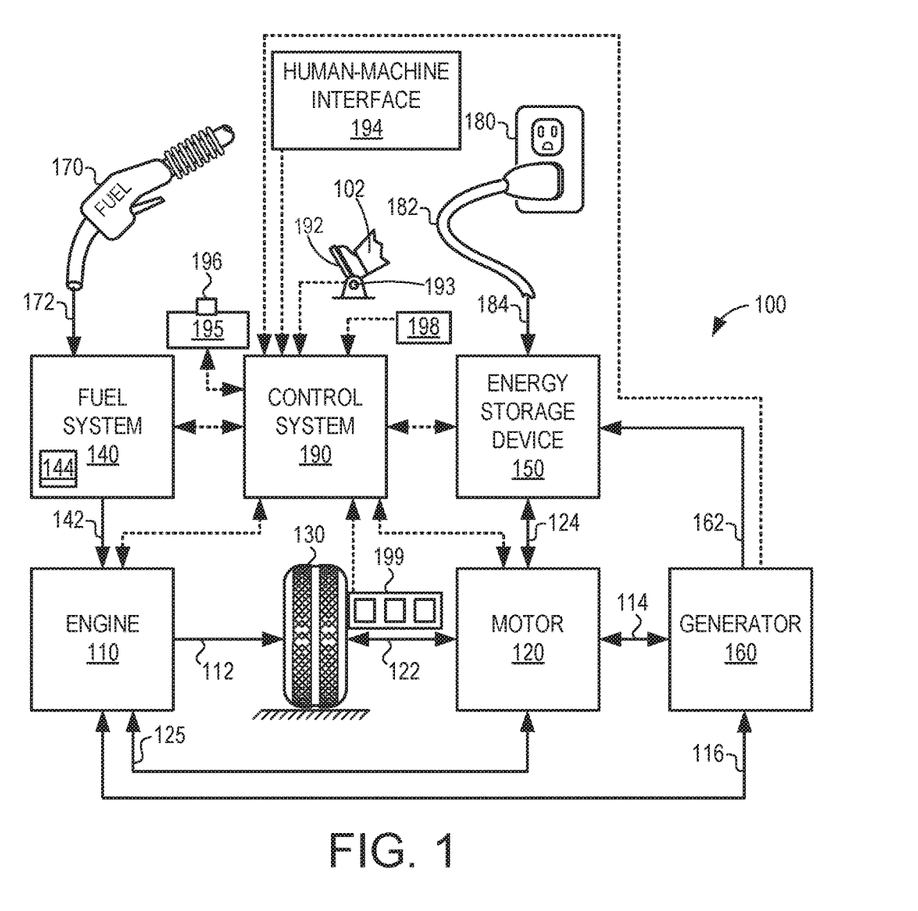
FIG. 1 schematically shows an example vehicle propulsion system.

FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (i.e., set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some embodiments. However, in other embodiments, generator 160 may instead receive wheel torque from drive wheel 130 (either directly, or via motor 120), where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

In other embodiments, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160 as indicated by arrow 116, which may in turn supply electrical energy to one or more of motor 120 as indicated by arrow 114 or energy storage device 150 as indicated by arrow 162. As another example, engine 110 may be operated to drive motor 120 as indicated by arrow 125, which may in turn provide a generator function to convert the engine output to electrical energy, where the electrical energy may be stored at energy storage device 150 for later use by the motor.

In some embodiments, motor 120 may be operated to rotate engine 110, as indicated by arrow 125. Generator 160 may also be operated to rotate engine 110 in addition to or as an alternative to motor 120. As an example, motor 120 may be operated as a starter motor by rotating engine 110 during a cold start operation. Motor 120 and/or generator 160 may rotate engine 110 without providing fuel to the engine for combustion. For example, during an electric-only mode of operation, rotating the engine may allow for the rotational velocity a rotating transmission component to be maintained or adjusted while concurrently adjusting the torque provided to drive wheels 130. In some scenarios, the engine may be rotated unfueled by the motor and/or generator in order to generate intake vacuum without expending fuel. Such unfueled rotation may be accomplished while the motor and/or generator are being utilized to propel the vehicle, and/or while the motor and/or generator are disengaged from the drive wheels (e.g., while the vehicle is parked, at an idle-stop, during decel fuel shutoff mode). In some examples, the engine may be rotated unfueled in a reverse (opposite) direction from the default (forward) direction of engine rotation. In this way, a vacuum may be generated in the engine exhaust. An example H-Bridge switch for a motor allowing for reverse rotation is shown in FIGS. 3A and 3B, while an example method utilizing reverse engine rotation is depicted in FIG. 4.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. As will be described by the process flow of FIG. 6, control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 193 which communicates with pedal 192. Pedal 192 may refer schematically to a brake pedal and/or an accelerator pedal.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (HEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may disconnected between power source 180 and energy storage device 150. Control system 190 may identify and/or control the amount of electrical energy stored at the energy storage device, which may be referred to as the state of charge (SOC).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel tank 144 may be configured to store the fuel received from fuel dispensing device 170 until it is supplied to engine 110 for combustion. In some embodiments, control system 190 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication via human-machine interface 194.

Human-machine interface 194 may include a vehicle instrument panel 195. The vehicle instrument panel 195 may include indicator light(s) and/or a text-based display in which messages are displayed to an operator. In some embodiments, the vehicle instrument panel 195 may communicate audio messages to the operator with or without displaying a visual message. The vehicle instrument panel 195 may also include various input portions for receiving an operator input, such as buttons, touch screens, voice input/recognition, etc. For example, the vehicle instrument panel 195 may include a refueling button 196 which may be manually actuated or pressed by a vehicle operator to initiate refueling. For example, as described in more detail below, in response to the vehicle operator actuating refueling button 196, a fuel tank in the vehicle may be depressurized so that refueling may be performed.

FIG. 2 shows a schematic depiction of a vehicle system 206. The vehicle system 206 includes an engine system 208 coupled to an emissions control system 251 and a fuel system 218. Emission control system 251 includes a fuel vapor container or canister 222 which may be used to capture and store fuel vapors. In some examples, vehicle system 206 may be a hybrid electric vehicle system.

The engine system 208 may include an engine 210 having a plurality of cylinders 230. The engine 210 includes an engine intake 223 and an engine exhaust 225. The engine intake 223 includes a throttle 262 fluidly coupled to the engine intake manifold 244 via an intake passage 242. The engine exhaust 225 includes an exhaust manifold 248 leading to an exhaust passage 235 that routes exhaust gas to the atmosphere. The engine exhaust 225 may include one or more exhaust catalyst 270, which may be mounted in a close-coupled position in the exhaust. One or more emission control devices may include a three-way catalyst, lean NOx trap, diesel particulate filter, oxidation catalyst, etc. It will be appreciated that other components may be included in the engine such as a variety of valves and sensors.

An air intake system hydrocarbon trap (AIS HC) 224 may be placed in the intake manifold of engine 210 to adsorb fuel vapors emanating from unburned fuel in the intake manifold, puddled fuel from leaky injectors and/or fuel vapors in crankcase ventilation emissions during engine-off periods. The AIS HC may include a stack of consecutively layered polymeric sheets impregnated with HC vapor adsorption/desorption material. Alternately, the adsorption/desorption material may be filled in the area between the layers of polymeric sheets. The adsorption/desorption material may include one or more of carbon, activated carbon, zeolites, or any other HC adsorbing/desorbing materials. When the engine is operational causing an intake manifold vacuum and a resulting airflow across the AIS HC, the trapped vapors are passively desorbed from the AIS HC and combusted in the engine. Thus, during engine operation, intake fuel vapors are stored and desorbed from AIS HC 224. In addition, fuel vapors stored during an engine shutdown can also be desorbed from the AIS HC during engine operation. In this way, AIS HC 224 may be continually loaded and purged, and the trap may reduce evaporative emissions from the intake passage even when engine 210 is shut down.

Fuel system 218 may include a fuel tank 220 coupled to a fuel pump system 221. The fuel pump system 221 may include one or more pumps for pressurizing fuel delivered to the injectors of engine 210, such as the example injector 266 shown. While only a single injector 266 is shown, additional injectors are provided for each cylinder. It will be appreciated that fuel system 218 may be a return-less fuel system, a return fuel system, or various other types of fuel system. Fuel tank 220 may hold a plurality of fuel blends, including fuel with a range of alcohol concentrations, such as various gasoline-ethanol blends, including E10, E85, gasoline, etc., and combinations thereof. A fuel level sensor 234 located in fuel tank 220 may provide an indication of the fuel level ("Fuel Level Input") to controller 212. As depicted, fuel level sensor 234 may comprise a float connected to a variable resistor. Alternatively, other types of fuel level sensors may be used.

Vapors generated in fuel system 218 may be routed to an evaporative emissions control system 251 which includes a fuel vapor canister 222 via vapor recovery line 231, before being purged to the engine intake 223. Vapor recovery line 231 may be coupled to fuel tank 220 via one or more conduits and may include one or more valves for isolating the fuel tank during certain conditions. For example, vapor recovery line 231 may be coupled to fuel tank 220 via one or more or a combination of conduits 271, 273, and 275.

Further, in some examples, one or more fuel tank vent valves in conduits 271, 273, or 275. Among other functions, fuel tank vent valves may allow a fuel vapor canister of the emissions control system to be maintained at a low pressure or vacuum without increasing the fuel evaporation rate from the tank (which would otherwise occur if the fuel tank pressure were lowered). For example, conduit 271 may include a grade vent valve (GVV) 287, conduit 273 may include a fill limit venting valve (FLVV) 285, and conduit 275 may include a grade vent valve (GVV) 283. Further, in some examples, recovery line 231 may be coupled to a fuel filler system 219. In some examples, fuel filler system may include a fuel cap 205 for sealing off the fuel filler system from the atmosphere. Refueling system 219 is coupled to fuel tank 220 via a fuel filler pipe or neck 211.

Further, refueling system 219 may include refueling lock 245. In some embodiments, refueling lock 245 may be a fuel cap locking mechanism. The fuel cap locking mechanism may be configured to automatically lock the fuel cap in a closed position so that the fuel cap cannot be opened. For example, the fuel cap 205 may remain locked via refueling lock 245 while pressure or vacuum in the fuel tank is greater than a threshold. In response to a refuel request, e.g., a vehicle operator initiated request, the fuel tank may be depressurized and the fuel cap unlocked after the pressure or vacuum in the fuel tank falls below a threshold. A fuel cap locking mechanism may be a latch or clutch, which, when engaged, prevents the removal of the fuel cap. The latch or clutch may be electrically locked, for example, by a solenoid, or may be mechanically locked, for example, by a pressure diaphragm.

In some embodiments, refueling lock 245 may be a filler pipe valve located at a mouth of fuel filler pipe 211. In such embodiments, refueling lock 245 may not prevent the removal of fuel cap 205. Rather, refueling lock 245 may prevent the insertion of a refueling pump into fuel filler pipe 211. The filler pipe valve may be electrically locked, for example by a solenoid, or mechanically locked, for example by a pressure diaphragm.

In some embodiments, refueling lock 245 may be a refueling door lock, such as a latch or a clutch which locks a refueling door located in a body panel of the vehicle. The refueling door lock may be electrically locked, for example by a solenoid, or mechanically locked, for example by a pressure diaphragm.

In embodiments where refueling lock 245 is locked using an electrical mechanism, refueling lock 245 may be unlocked by commands from controller 212, for example, when a fuel tank pressure decreases below a pressure threshold. In embodiments where refueling lock 245 is locked using a mechanical mechanism, refueling lock 245 may be unlocked via a pressure gradient, for example, when a fuel tank pressure decreases to atmospheric pressure.

Emissions control system 251 may include one or more emissions control devices, such as one or more fuel vapor canisters 222 filled with an appropriate adsorbent, the canisters are configured to temporarily trap fuel vapors (including vaporized hydrocarbons) during fuel tank refilling operations and "running loss" (that is, fuel vaporized during vehicle operation). In one example, the adsorbent used is activated charcoal. Emissions control system 251 may further include a canister ventilation path or vent line 227 which may route gases out of the canister 222 to the atmosphere when storing, or trapping, fuel vapors from fuel system 218.

Canister 222 may include a buffer 222a (or buffer region), each of the canister and the buffer comprising the adsorbent. As shown, the volume of buffer 222a may be smaller than (e.g., a fraction of) the volume of canister 222. The adsorbent in the buffer 222a may be same as, or different from, the adsorbent in the canister (e.g., both may include charcoal). Buffer 222a may be positioned within canister 222 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine. One or more temperature sensors 232 may be coupled to and/or within canister 222. As fuel vapor is adsorbed by the adsorbent in the canister, heat is generated (heat of adsorption). Likewise, as fuel vapor is desorbed by the adsorbent in the canister, heat is consumed. In this way, the adsorption and desorption of fuel vapor by the canister may be monitored and estimated based on temperature changes within the canister.

Vent line 227 may also allow fresh air to be drawn into canister 222 when purging stored fuel vapors from fuel system 218 to engine intake 223 via purge line 228 and purge valve 261. For example, purge valve 261 may be normally closed but may be opened during certain conditions so that vacuum from engine intake manifold 244 is provided to the fuel vapor canister for purging. In some examples, vent line 227 may include an air filter 259 disposed therein upstream of a canister 222.

In some examples, the flow of air and vapors between canister 222 and the atmosphere may be regulated by a canister vent valve coupled within vent line 227. When included, the canister vent valve may be a normally open valve, so that fuel tank isolation valve 252 (FTIV) may control venting of fuel tank 220 with the atmosphere. FTIV 252 may be positioned between the fuel tank and the fuel vapor canister within conduit 278. FTIV 252 may be a normally closed valve, that when opened, allows for the venting of fuel vapors from fuel tank 220 to canister 222. Fuel vapors may then be vented to atmosphere, or purged to engine intake system 223 via canister purge valve 261.

Fuel system 218 may be operated by controller 212 in a plurality of modes by selective adjustment of the various valves and solenoids. For example, the fuel system may be operated in a fuel vapor storage mode (e.g., during a fuel tank refueling operation and with the engine not running), wherein the controller 212 may open isolation valve 252 while closing canister purge valve (CPV) 261 to direct refueling vapors into canister 222 while preventing fuel vapors from being directed into the intake manifold.

As another example, the fuel system may be operated in a refueling mode (e.g., when fuel tank refueling is requested by a vehicle operator), wherein the controller 212 may open isolation valve 252, while maintaining canister purge valve 261 closed, to depressurize the fuel tank before allowing enabling fuel to be added therein. As such, isolation valve 252 may be kept open during the refueling operation to allow refueling vapors to be stored in the canister. After refueling is completed, the isolation valve may be closed.

As yet another example, the fuel system may be operated in a canister purging mode (e.g., after an emission control device light-off temperature has been attained and with the engine running), wherein the controller 212 may open canister purge valve 261 while closing isolation valve 252. Herein, the vacuum generated by the intake manifold of the operating engine may be used to draw fresh air through vent 27 and through fuel vapor canister 22 to purge the stored fuel vapors into intake manifold 44. In this mode, the purged fuel vapors from the canister are combusted in the engine. The purging may be continued until the stored fuel vapor amount in the canister is below a threshold.

Controller 212 may comprise a portion of a control system 214. Control system 214 is shown receiving information from a plurality of sensors 216 (various examples of which are described herein) and sending control signals to a plurality of actuators 281 (various examples of which are described herein). As one example, sensors 216 may include exhaust gas sensor 237 located upstream of the emission control device, temperature sensor 233, pressure sensor 291, and canister temperature sensor 243. Other sensors such as pressure, temperature, air/fuel ratio, and composition sensors may be coupled to various locations in the vehicle system 206. As another example, the actuators may include intake throttle 262, fuel tank isolation valve 253, canister purge valve 261, and canister vent valve 297. The control system 214 may include a controller 212. The controller may receive input data from the various sensors, process the input data, and trigger the actuators in response to the processed input data based on instruction or code programmed therein corresponding to one or more routines. An example control routine is described herein with regard to FIG. 4.

In some examples, the controller may be placed in a reduced power mode or sleep mode, wherein the controller maintains essential functions only, and operates with a lower battery consumption than in a corresponding awake mode. For example, the controller may be placed in a sleep mode following a vehicle-off event in order to perform a diagnostic routine at a duration after the vehicle-off event. The controller may have a wake input that allows the controller to be returned to an awake mode based on an input received from one or more sensors. For example, the opening of a vehicle door may trigger a return to an awake mode.

Leak detection routines may be intermittently performed by controller 212 on fuel system 218 to confirm that the fuel system is not degraded. As such, leak detection routines may be performed while the engine is off (engine-off leak test) using engine-off natural vacuum (EONV) generated due to a change in temperature and pressure at the fuel tank following engine shutdown and/or with vacuum supplemented from a vacuum pump. Alternatively, leak detection routines may be performed while the engine is running by operating a vacuum pump and/or using engine intake manifold vacuum. In some configurations, a canister vent valve (CVV) 297 may be coupled within vent line 227. CVV 297 may function to adjust a flow of air and vapors between canister 222 and the atmosphere. The CVV may also be used for diagnostic routines. When included, the CVV may be opened during fuel vapor storing operations (for example, during fuel tank refueling and while the engine is not running) so that air, stripped of fuel vapor after having passed through the canister, can be pushed out to the atmosphere. Likewise, during purging operations (for example, during canister regeneration and while the engine is running), the CVV may be opened to allow a flow of fresh air to strip the fuel vapors stored in the canister. In some examples, CVV 297 may be a solenoid valve wherein opening or closing of the valve is performed via actuation of a canister vent solenoid. In particular, the canister vent valve may be an open that is closed upon actuation of the canister vent solenoid. In some examples, CVV 297 may be configured as a latchable solenoid valve. In other words, when the valve is placed in a closed configuration, it latches closed without requiring additional current or voltage. For example, the valve may be closed with a 100 ms pulse, and then opened at a later time point with another 100 ms pulse. In this way, the amount of battery power required to maintain the CVV closed is reduced. In particular, the CVV may be closed while the vehicle is off, thus maintaining battery power while maintaining the fuel emissions control system sealed from atmosphere.

As described with regard to FIG. 1, a vehicle engine may be rotated or spun by an electric motor while the engine is not actively combusting fuel. Such unfueled spinning may be utilized to affect the operation of one or more transmission components and/or other components of a vehicle propulsion system. Additionally, the engine may be spun unfueled to generate vacuum in an engine intake without fuel expenditure. Further, the engine may be spun unfueled in a reverse direction to generate vacuum in an engine exhaust and a positive pressure in the engine intake. This may be accomplished by operating an electric motor coupled to the engine in a reverse direction.

FIGS. 3A and 3B show an example circuit 300 that may be used for reversing a spin orientation of an electric motor. Circuit 300 schematically depicts an H-Bridge circuit that may be used to run a motor 310 in a first (forward) direction and alternately in a second (reverse) direction. Circuit 300 comprises a first (LO) side 320 and a second (HI) side 330. Side 320 includes transistors 321 and 322, while side 330 includes transistors 331 and 332. Circuit 300 further includes a power source 340.

In FIG. 3A, transistors 321 and 332 are activated, while transistors 322 and 331 are turned off. In this confirmation, the left lead 351 of motor 310 is connected to power source 340, and the right lead 352 of motor 310 is connected to ground. In this way, motor 310 may run in a forward direction. When operating the engine in a forward direction via the motor, the engine may be in a cranking mode for initial combustion commencement. Additionally and/or alternatively, when operating the engine in a forward direction via the motor, the engine (and motor or another motor) may be in a drive mode to drive the vehicle. During one or more of or each of the forward engine rotation operations, fuel vapors may also be purged to the engine with and/or without engine combustion occurring.

In FIG. 3B, transistors 322 and 331 are activated, while transistors 321 and 332 are turned off. In this confirmation, the right lead 352 of motor 310 is connected to power source 340, and the left lead 351 of motor 310 is connected to ground. In this way, motor 310 may run in a reverse direction.

As described herein, an air intake system hydrocarbon (AIS HC) trap may capture hydrocarbons emitted by leaky injectors for from fuel that may puddle in intake as well as uncombusted fuel that is trapped within the engine cylinders themselves. The captured hydrocarbons are typically purged to engine intake for combustion. However, hybrid vehicles may operate for prolonged periods without combusting fuel, thus limiting purge opportunities. This may lead to an increase in bleed emissions and/or require the engine to be forced on to purge the AIS HC trap, thus decreasing the fuel economy of the vehicle.

FIG. 4 shows a flow chart for an example high-level method 400 for evacuating an AIS hydrocarbon trap in a hybrid-electric vehicle. More specifically, method 400 may be used to reduce vehicle emissions by spinning an engine unfueled and in reverse to evacuate the contents of the hydrocarbon trap to the fuel vapor canister. Method 400 will be described with regard to the systems described herein and depicted in FIGS. 1, 2, and 3A-3B, though it should be understood that method 400 may be applied to other systems without departing from the scope of this disclosure. Method 400 may be carried out by a controller, such as controller 212 as depicted in FIG. 2, and may be stored as executable instructions in non-transitory memory. The controller may execute method 400 in conjunction with signals received from sensors of the engine system, such as the sensors described above with reference to FIGS. 1 and 2. The controller may employ engine actuators of the engine system to adjust engine operation, according to the methods described below.

Method 400 begins at 405. At 405, method 400 includes evaluating operating conditions. Operating conditions may be measured, estimated or inferred. Operating conditions may include various vehicle conditions, such as vehicle speed, vehicle location, etc., various engine conditions, such as engine speed, engine load, engine status, etc., various fuel system conditions, such as fuel level, fuel tank pressure, canister load, etc., various ambient conditions, such as ambient temperature, humidity, barometric pressure, etc., and other relevant operating conditions.

Continuing at 410, method 400 includes determining whether a vehicle-off event has occurred. A vehicle-off event may be indicated by a key-off event, a user setting a vehicle alarm following exiting a vehicle that has been parked, or other suitable indicator. If no vehicle-off event has been detected, method 400 proceeds to 415. At 415, method 400 includes maintaining the status of the engine and emissions control systems. For example, valves within the emissions control system may be maintained in their current conformation, and engine operating conditions may be maintained with their current operating parameters. Method 400 may then end.

If a vehicle-off event is detected, method 400 proceeds to 420. At 420, method 400 includes determining whether an AIS HC trap purge is indicated. For example, an indication to purge the AIS HC trap may be stored at a vehicle controller. The indication may be based on an AIS HC trap load. An AIS HC trap load may be measured, estimated, or inferred. The AIS HC trap load may be evaluated against a threshold, above which purging the AIS HC trap is indicated. In some embodiments, the AIS HC trap load may be inferred based on an amount of engine drive time during a drive cycle immediately preceding the vehicle-off event. For example, a drive cycle wherein the vehicle was operated in an engine-combustion mode for a duration and in a battery-only mode for a duration may correspond with an AIS HC trap load greater than a threshold. In other words, if the engine is operated in combustion mode for a limited time during a drive cycle, the AIS HC trap may accumulate uncombusted fuel without an opportunity to purge the contents of the trap to the engine. As an example, the drive cycle immediately preceding the vehicle-off event may comprise a first phase wherein the vehicle was operated in a combustion mode for a longer duration than in a battery-only mode, and a second phase, following the first phase, wherein the vehicle was operated in a combustion mode for a shorter duration than in a battery-only mode. Such a drive cycle may trigger an indication to purge the MS HC trap, as there would have been limited opportunities to purge the trap during the second phase of the drive cycle while operating primarily in battery-only mode.

If an AIS HC trap purge is not indicated, method 400 proceeds to 415, and includes maintaining the status of the engine and emissions control systems. If an AIS HC trap purge is indicated, method 400 proceeds to 425. At 425, method 400 includes determining whether a canister load is greater than a threshold. The canister load may be stored at a controller, such as controller 212, and may be determined based on quantities of refueling vapor adsorbed by the canister, and quantities of hydrocarbons that have been desorbed from the canister during purge events. The canister load threshold may be based on an amount of uncombusted fuel and hydrocarbons expected to be adsorbed within the AIS HC TRAP. If a temperature sensor is coupled to the fuel vapor canister, temperature changes within the canister during loading and purge events may be used to determine the canister load. The canister load may additionally or alternatively be determined based on fuel tank pressure prior to and during refueling events, readings from hydrocarbon sensors and/or oxygen sensors, etc. If the canister load is relatively high, (e.g., no purge event has occurred since a recent refueling event) the canister may not be able to store additional hydrocarbons. As such, if the canister load is above the threshold, method 400 proceeds to 430. At 430, method 400 includes aborting the method, updating evaporative emissions system parameters, and placing the controller in a sleep mode. Method 400 may then end. Updating evaporative emissions system parameters may include recording, at the controller, the AIS HC load, the fuel vapor canister load, etc., and may further include updating a canister purge schedule and an AIS HC purge schedule. As an example, at the next vehicle-on event, the engine may be commanded to operate in a combustion mode in order to purge one or both hydrocarbon traps, even if engine operation is not necessary to propel the vehicle.

If the canister load is below the threshold, method 400 proceeds to 435. Although operating conditions may indicate proceeding to 435 and continuing further onwards, changes in operating conditions, such as a vehicle-on condition, the detection of a refueling event, etc., may lead to aborting method 400. At 435, method 400 includes putting the controller in a sleep mode, and then waking the controller following a duration. The duration may be pre-determined or based on current operating conditions. For example, the duration may be based on an engine coolant temperature at the vehicle-off event, a canister temperature at the vehicle-off event, an ambient temperature, an ambient temperature trajectory, and/or other operating conditions, and/or any combination thereof. Upon waking the controller following the duration, the controller may be operated in a limited power consumption mode in order to maintain battery charge.

At 440, method 400 includes closing the FTIV (or maintaining the FTIV closed) and the intake throttle valve. Method 400 may further include maintaining the controller awake for the duration of method 400. By closing the FTIV, the canister load is maintained at a current level. By closing the intake throttle valve, air and gasses entering the intake manifold and intake system throughout method 400 are prevented from escaping through the engine intake passage.

Continuing at 445, method 400 includes opening the CPV and the CVV (or maintaining the CVV open). By opening the CPV, the engine intake is coupled to the fuel vapor canister, and with the intake throttle valve closed, the air and gasses entering the intake manifold and intake system throughout method 400 are directed to the fuel vapor canister. With the CVV open, gasses stripped of hydrocarbons exiting the fuel vapor canister may be released to atmosphere, and a flow direction is established.

Continuing at 450, method 400 may include spinning the engine unfueled in reverse. For example, an electric motor, such as a starter motor may be operated to spin the engine. The controller may be configured to disable spark and fuel injection. The intake throttle valve may be placed or maintained in a partially open position to prevent an intake vacuum from developing. The engine may be spun unfueled at a predetermined speed, or for a speed based on current operating conditions. The engine may be spun at a relatively low speed, for example at idling speed or lower, but may be spun at a higher speed if more heat generation is necessary (e.g., ambient temperatures are below a threshold), or if a larger pressure gradient is necessary.

Continuing at 455, method 400 may include purging the AIS HC trap to the fuel vapor canister. For engine systems with cam-actuated valve timing, cylinder exhaust valves may be opened during the engine spinning, allowing atmospheric air to enter an engine cylinder. Subsequently, when a cylinder intake valve is opened, the atmospheric air may enter the intake manifold. The intake manifold pressure may then stimulate desorption of hydrocarbons from the AIS HC trap. The desorbed hydrocarbons may then be directed to the fuel vapor canister via the open CPV. In other examples, for engines configured with dual independent variable cam timing, one or more engine cylinders may be placed in a conformation with both the intake valve open and the exhaust valve open, thus coupling the exhaust system to intake. In other words, the exhaust and intake valves may be opened sequentially or simultaneously, depending on the valve configurations.

The engine may continue to be spun in reverse for a pre-determined duration (such as a predetermined number of engine cycles), or for a duration based on operating conditions, such as the AIS HC trap load. As an example, if the fuel vapor canister temperature plateaus, it may be assumed that either the canister is saturated, or that no additional hydrocarbons are entering the canister. Intake and exhaust oxygen sensors may further inform the duration of the engine spinning.

Continuing at 460, method 400 includes returning the cylinders and actuators to a default vehicle-off conformation. For example, the engine cylinders may be rotated into a position that would be used for engine start-up, and cylinder valves opened or closed accordingly. The CPV may be closed, the intake throttle valve placed in a default position, and the CVV opened. The electric motor and/or electric generator may be placed in a conformation for rotating the engine in a forward direction, and/or the engine may be restored to a default engine-off conformation.

Continuing at 465, method 400 includes updating the canister load and canister purge schedule. For example, the controller may update the canister load to reflect the quantity of hydrocarbons adsorbed during the AIS HC trap purging operations, and the canister purge schedule may be updated based on the updated canister load. Continuing at 470, method 400 includes placing the controller in a sleep mode. Method 400 may then end.

FIG. 5 depicts an example timeline 500 for purging hydrocarbons to a fuel vapor canister following a vehicle-off event using the method described herein and with reference to FIG. 4. Timeline 500 includes plot 510, indicating a vehicle status over time; plot 520, indicating a controller status over time; plot 530, indicating an intake throttle valve position over time; plot 540, indicating a FTIV status over time; and plot 550, indicating a CPV status over time. Timeline 500 further includes plot 560, indicating the status of an electric motor configured to rotate the engine over time. Timeline 500 further includes plot 570, indicating a fuel vapor canister load over time. Line 575 represents a canister load threshold for initiating hydrocarbon purging, as described with reference to 425 of method 400 in FIG. 4. Timeline 500 further includes plot 580, indicating an air intake system hydrocarbon trap load over time. Line 585 represents a AIS HC load threshold for initiating hydrocarbon purging, as described with reference to 420 of method 400 in FIG. 4. A canister vent valve may be assumed to be open for the duration of timeline 500.

At time $t_0$, the vehicle is on, as indicated by plot 510. Accordingly, the controller is awake, as indicated by plot 520, the intake throttle valve is open, as indicated by plot 530, the FTIV is closed, as indicated by plot 540, and the CPV is closed, as indicated by plot 550. The electric motor is off, as indicated by plot 560. From time $t_0$ to time $t_1$, the intake throttle valve closes as the vehicle slows down. At time $t_1$, the vehicle is turned off. The canister load, as indicated by plot 570, is below the threshold represented by line 575, and the AIS HC trap load, as indicated by plot 580 is above the threshold represented by line 585. As such, conditions are met for purging the AIS HC trap to the fuel vapor canister. The controller is then put to sleep for a duration spanning time $t_2$ through time $t_3$, allowing for system equilibration.

At time $t_3$, when the controller is re-awakened, the intake throttle valve is placed in a closed position, and the CPV is opened. The electric motor is turned on in a reverse direction, as indicated by plot 560. In this conformation, the engine is spun in reverse, drawing atmospheric air through the engine exhaust and into the engine intake. The flow of atmospheric air desorbs residual hydrocarbons and uncombusted fuel from the AIS HC trap into the engine intake, and then to the fuel vapor canister via the open CPV. Accordingly, the canister load increases. At time $t_4$, the canister load reaches a plateau, indicating that the AIS HC trap is substantially purged of hydrocarbons. Accordingly, the electric motor is turned off, the CPV is closed, and the intake throttle valve is returned to a default (slightly open) position. At time $t_5$, the controller is again placed in an asleep mode.

The systems described herein and with reference to FIGS. 1, 2, 3A and 3B, along with the methods described herein and with reference to FIG. 4 may enable one or more systems and one or more methods. In one example, a method for a vehicle is provided, comprising: during a first condition, following a vehicle-off event, placing a vehicle controller in a sleep mode; waking the vehicle controller following a duration; operating an electric motor to rotate a vehicle engine in a reverse direction; and purging contents of an air intake system hydrocarbon trap to a fuel vapor canister. In this example, or any other example, rotating the engine in a reverse direction may additionally or alternatively comprise rotating the engine in an opposite direction from a default direction, and may additionally or alternatively comprise rotating the engine to generate a vacuum in an engine exhaust. In this example, or any other example, the first condition may additionally or alternatively comprise includes an indication to purge the air intake system hydrocarbon trap to the fuel vapor canister. In this example, or any other example, the indication to purge the air intake system hydrocarbon trap to the fuel vapor canister may additionally or alternatively be based on an air intake system hydrocarbon trap load. In this example, or any other example, the air intake system hydrocarbon trap load may additionally or alternatively be based on an amount of engine drive time during a drive cycle immediately preceding the vehicle-off event. In this example, or any other example, the indication to purge the air intake system hydrocarbon trap to the fuel vapor canister may additionally or alternatively be based on an indication that the drive cycle immediately preceding the vehicle-off event comprised a first phase wherein the vehicle was operated in a combustion mode for a longer duration than in a battery-only mode, and a second phase, following the first phase, wherein the vehicle was operated in a combustion mode for a shorter duration than in a battery-only mode. In this example, or any other example, the first condition may additionally or alternatively comprise a canister load below a threshold. In this example, or any other example, the method may additionally or alternatively comprise rotating the vehicle engine in a reverse direction without combusting fuel, and during a second condition may additionally or alternatively comprise operating the electric motor to rotate the vehicle engine in a forward direction. In this example, or any other example, the method may additionally or alternatively comprise closing an intake throttle valve prior to purging contents of air intake system hydrocarbon trap to the fuel vapor canister. In this example, or any other example, purging contents of air intake system hydrocarbon trap to the fuel vapor canister may additionally or alternatively comprise opening a canister purge valve. In this example, or any other example, the method may additionally or alternatively comprise following purging contents of one or more engine cylinders to the fuel vapor canister, restoring the engine to a default, engine-off position. In this example, or any other example, the method may additionally or alternatively comprise, following purging contents of the air intake system hydrocarbon trap to the fuel vapor canister, updating a canister purge schedule. The technical result of implementing this method is a reduction of bleed emissions in hybrid vehicles. By evacuating the air intake system hydrocarbon trap to the fuel vapor canister, uncombusted fuel that may otherwise migrate out of the engine intake or engine exhaust during a vehicle-off soak are adsorbed following a vehicle-off event.

In another example, a system for a vehicle is presented. The system comprises an engine comprising one or more cylinders, each cylinder comprising an intake valve and an exhaust valve; an engine exhaust; a fuel vapor canister coupled to an engine intake via a canister purge valve; an intake throttle valve coupled between the engine intake and atmosphere; an air intake system hydrocarbon trap deposed within the engine intake; an electric motor configured to rotate the engine; and a controller configured with instructions stored in non-transitory memory, that when executed cause the controller to: following a vehicle-off event, enter a sleep mode; wake following a duration; close the intake throttle valve; open the canister purge valve; operate an electric motor to rotate the engine in a reverse direction; and purge contents of the air intake system hydrocarbon trap to the fuel vapor canister. In this example or any other example, the controller may additionally or alternatively be configured with instructions stored in non-transitory memory, that when executed cause the controller to operate the electric motor to rotate the engine in a reverse direction without combusting fuel. In this example or any other example, the controller may additionally or alternatively be configured with instructions stored in non-transitory memory, that when executed cause the controller to sequentially open an exhaust valve and an intake valve of an engine cylinder while rotating the vehicle engine in reverse. In this example or any other example, the controller may additionally or alternatively be configured with instructions stored in non-transitory memory, that when executed cause the controller to simultaneously open an exhaust valve and an intake valve of an engine cylinder while rotating the vehicle engine in reverse. In this example or any other example, the controller may additionally or alternatively be configured with instructions stored in non-transitory memory, that when executed cause the controller to restore the engine to a default, engine-off position following purging contents of the air intake system hydrocarbon trap to the fuel vapor canister, and update a canister purge schedule. In this example, or any other example, the first condition may additionally or alternatively include an indication to purge the air intake system hydrocarbon trap based on engine operating parameters during a drive cycle immediately preceding the vehicle-off event. The technical result of implementing this system is an increase in rate of passing 2 and 3 day diurnal certification tests. The system stores hydrocarbons in the fuel vapor canister that could otherwise escape to atmosphere. In this way, the emissions for a vehicle may be reduced.

In yet another example, a method for a hybrid vehicle is provided, comprising: following a vehicle-off event, responsive to a fuel vapor canister load below a threshold and an indication to purge an air intake system hydrocarbon trap, placing a controller in a sleep mode for a duration; waking the controller following the duration; closing an intake throttle valve; opening a canister purge valve; operating an electric motor to spin an engine unfueled in a reverse direction; purging contents of the air intake system hydrocarbon trap to the fuel vapor canister; restoring the engine to a default, engine-off position; and updating a fuel vapor canister purge schedule. The technical result of implementing this method is that the air intake system hydrocarbon trap may be evacuated without requiring secondary air injection or a vacuum pump. In this way, bleed emissions for the vehicle may be reduced without the added expense of additional, dedicated hardware.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a vehicle, comprising:
executing, automatically, instructions stored in non-transitory memory of a controller, causing the controller to:
during a first condition comprising a detected vehicle-off event, enter into a sleep mode;
wake following a duration;
open a canister vent valve and a canister purge valve;
close a fuel tank isolation valve and an intake throttle valve; and
purge adsorbed hydrocarbons from an air intake system hydrocarbon trap and direct desorbed hydrocarbons to a fuel vapor canister by operating an electric motor to rotate a vehicle engine in a reverse direction causing air to flow from an engine exhaust, across the air intake system hydrocarbon trap, and to the fuel vapor canister, while maintaining the fuel tank isolation valve and the intake throttle valve closed, and while maintaining the canister vent valve and the canister purge valve open.

2. The method of claim 1, wherein rotating the vehicle engine in the reverse direction comprises rotating the vehicle engine in an opposite direction from a default direction, and further comprises rotating the vehicle engine to generate a vacuum in the engine exhaust.

3. The method of claim 1, wherein the first condition includes an indication to purge the air intake system hydrocarbon trap to the fuel vapor canister.

4. The method of claim 3, wherein the indication to purge the air intake system hydrocarbon trap to the fuel vapor canister is based on an air intake system hydrocarbon trap load.

5. The method of claim 4, wherein the air intake system hydrocarbon trap load is based on an amount of engine drive time during a drive cycle immediately preceding the vehicle-off event.

6. The method of claim 5, wherein the indication to purge the air intake system hydrocarbon trap to the fuel vapor canister is based on an evaluation by the vehicle controller that the drive cycle immediately preceding the vehicle-off event comprised operation in a combustion mode followed by operation in a battery-only mode.

7. The method of claim 3, wherein the first condition comprises a canister load below a threshold.

8. The method of claim 1, wherein the vehicle engine is rotated in the reverse direction without combusting fuel, and wherein the method further comprises:
during a second condition, operating the electric motor to rotate the vehicle engine in a forward direction.

9. The method of claim 1, further comprising:
following purging contents of the air intake system hydrocarbon trap to the fuel vapor canister, restoring the vehicle engine to a default, engine-off position.

10. The method of claim 1, further comprising:
following purging contents of the air intake system hydrocarbon trap to the fuel vapor canister, updating a canister purge schedule.

11. The method of claim 1, wherein the first condition includes an indication to purge the air intake system hydrocarbon trap based on engine operating parameters during a drive cycle immediately preceding the vehicle-off event.

12. A system for a vehicle, comprising:
an engine comprising one or more cylinders, each cylinder comprising an intake valve and an exhaust valve;
an engine exhaust;
a fuel vapor canister coupled to an engine intake via a canister purge valve;
an intake throttle valve coupled between the engine intake and atmosphere;
a fuel tank isolation valve;
a canister vent valve;
an air intake system hydrocarbon trap deposed within the engine intake;
an electric motor configured to rotate the engine; and
a controller configured with instructions stored in non-transitory memory that, when executed, cause the controller to:
during a first condition comprising a detected vehicle-off event, enter a sleep mode;
wake automatically following a duration from the sleep mode;
close the intake throttle valve and the fuel tank isolation valve;
open the canister purge valve and the canister vent valve; and
purge contents of the air intake system hydrocarbon trap to the fuel vapor canister by operating an electric motor to rotate the engine in a reverse direction, while maintaining the fuel tank isolation valve and the intake throttle valve closed, and while maintaining the canister vent valve and the canister purge valve open, causing air to flow from the engine exhaust, across the air intake system hydrocarbon trap, and to the fuel vapor canister.

13. The system of claim 12, wherein the controller is further configured with instructions stored in non-transitory memory that, when executed, cause the controller to:
operate the electric motor to rotate the engine in the reverse direction without combusting fuel, and then return to the sleep mode.

14. The system of claim 13, wherein the controller is further configured with instructions stored in non-transitory memory that, when executed, cause the controller to:
sequentially open the exhaust valve and the intake valve of an engine cylinder while rotating the engine in the reverse direction.

15. The system of claim 13, wherein the controller is further configured with instructions stored in non-transitory memory that, when executed, cause the controller to:
simultaneously open the exhaust valve and the intake valve of an engine cylinder while rotating the engine in the reverse direction.

16. The system of claim 12, wherein the controller is further configured with instructions stored in non-transitory memory that, when executed, cause the controller to:
following purging contents of the air intake system hydrocarbon trap to the fuel vapor canister, restore the engine to a default, engine-off position; and
update a canister purge schedule.

17. The system of claim 12, wherein the first condition includes an indication to purge the air intake system hydrocarbon trap based on engine operating parameters during a drive cycle immediately preceding the vehicle-off event.

18. A method for a hybrid vehicle, comprising:
following a detected vehicle-off event, responsive to a fuel vapor canister load below a threshold and an indication to purge an air intake system hydrocarbon trap, a controller automatically executes instructions stored in non-transitory memory, causing the controller to:
enter a sleep mode for a duration;
wake following the duration;
close an intake throttle valve and a fuel tank isolation valve;

open a canister purge valve and a canister vent valve;
purge contents of the air intake system hydrocarbon trap directly to a fuel vapor canister by operating an electric motor to rotate an engine in a reverse direction, while maintaining the fuel tank isolation valve and the intake throttle valve closed, and while maintaining the canister vent valve and the canister purge valve open, causing air to flow from an engine exhaust, across the air intake system hydrocarbon trap, and to the fuel vapor canister;
restore the engine to a default, engine-off position; and
update a fuel vapor canister purge schedule.

* * * * *